April 15, 1952 L. DUFOUR 2,592,668
LOCKING MECHANISM FOR A DIFFERENTIAL
Filed Aug. 24, 1949 2 SHEETS—SHEET 1
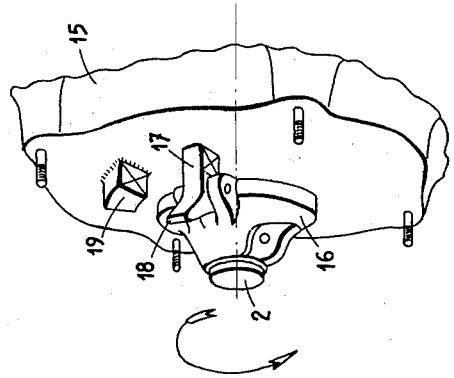
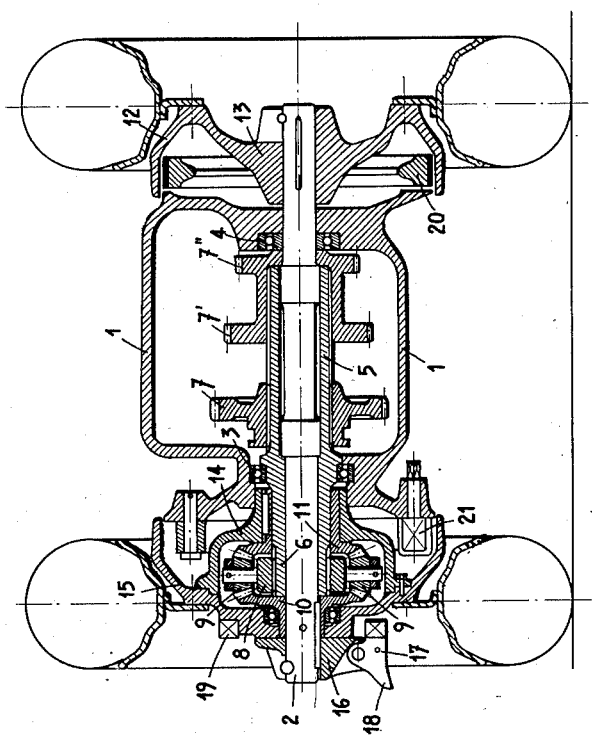
INVENTOR
Leon Dufour.
BY
ATTORNEY April 15, 1952     L. DUFOUR     2,592,668
LOCKING MECHANISM FOR A DIFFERENTIAL
Filed Aug. 24, 1949     2 SHEETS—SHEET 2
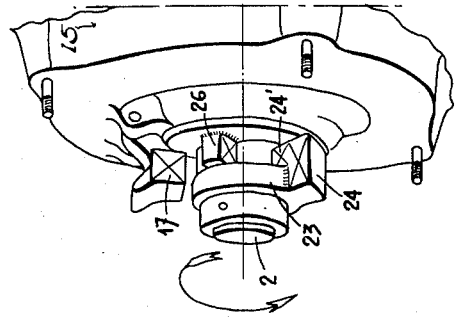
fig.6
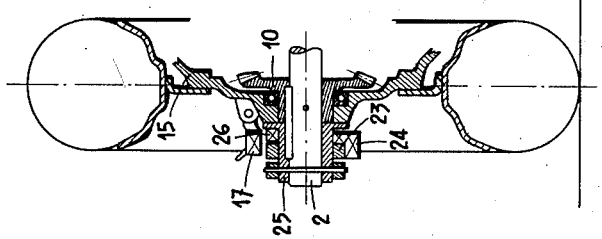
fig.5
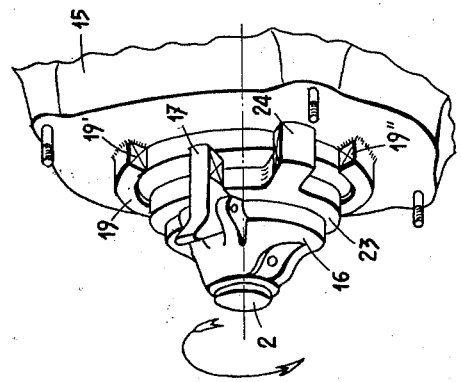
fig.4
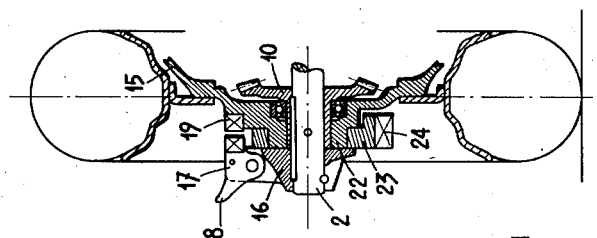
fig.3
INVENTOR
Leon Dufour.
BY 
ATTORNEY Patented Apr. 15, 1952

2,592,668

UNITED STATES PATENT OFFICE 2,592,668

LOCKING MECHANISM FOR A DIFFERENTIAL

Léon Dufour, Geneva, Switzerland

Application August 24, 1949, Serial No. 112,083
In Switzerland September 8, 1948

3 Claims. (Cl. 74—711)

The present invention has for its subject a mechanism for locking a differential, consisting of a lever secured to one of the sun wheels of the differential and a boss secured to the other sun wheel, the arrangement of these members being such that the lever is stopped in its circular course by the boss when it is moved into the locking position.

When a small agricultural tractor, for example a small tractor with an axle steered by means of a steering wheel, is provided with a differential, it is necessary to provide the differential with a locking mechanism. In fact, when the small tractor pulls a plough, one of the wheels of the tractor rolls in the bottom of the furrow, and the other on the ground which is not tilled. The lateral inclination of the small tractor is considerable as its track is relatively narrow. As the wheel which rolls on the ground which is not tilled is less loaded, by reason of this inclination, than that which rolls on the bottom of the furrow, it has a constant tendency to skid, which makes it necessary to lock the differential during tillage. But, as the small tractor, when it is provided with a reversible plough, should be capable of turning about itself at the end of the furrow, it is necessary to release the differential for this turning, and then to re-lock it at the beginning of the next furrow. When the small tractor with an axle, steered by means of a steering wheel, is of a type provided with a differential located on the outside of the speed gear box, with locking by a lever actuated manually and placed against the differential, this requires a complicated and lengthy operation by the driver. He must stop his machine at the end of the furrow, slacken the steering wheel, unlock the differential, then return to the steering wheel, carry out the steering, then return to the differential for again locking it and finally take the steering wheel for starting the next furrow. This represents a loss of time which is inadmissible during tillage.

The object of the present invention applied to the above mentioned small tractor, enables the driver to keep the differential locked during the whole duration of tillage, and meanwhile capable of carrying out the necessary steering operations of 180° at each end of the furrows, without any unlocking of the differential.

In order to obtain this result, a clearance of about a complete revolution is provided between the lever and the boss.

The clearance between one of the driving wheels relatively to the other may be slightly less than one complete revolution.

In this case there is provided a lever that abuts directly against the boss first on one side thereof and then on the other side thereof, so that the total clearance between the said two sun wheels is equal to a complete revolution minus the thickness of said boss and the thickness of said lever.

The clearance between one of the driving wheels relatively to the other may also exceed a complete revolution. In such a case, there is provided a ring freely mounted between the bolt and the boss and a nose on said ring, the lever only abutting against said nose, said nose in turn abutting against said boss, the arrangement being such that the clearance between said sun wheels is composed of the clearance between said lever and said nose, plus the clearance between said nose and said boss.

In the case of a small agricultural tractor, the invention consists in locking the differential by a mechanism such that there exists between the two driving wheels of the tractor a clearance of about a complete revolution of one of the wheels relatively to the other. For effecting a turning of 180°, it is necessary in fact for one of the driving wheels to make one revolution more than the other, when the rolling diameter of the wheels is equal their inter-axis or spacing. When the diameter of the wheels is smaller than their spacing, it is necessary that one of the wheels makes more than one revolution more than the other. On the contrary, this wheel need only make one complete revolution more than the other, when the diameter of the wheels is greater than their spacing. When the tractor moves forwards along a straight line along the furrow, the wheel which rolls on the ground which is not tilled, skids and causes the locking mechanism to operate very quickly. From this moment the two wheels have become locked and the play of the locking mechanism remains in-operative until the moment of the next steering.

The accompanying drawings show by way of example a number of forms of construction of the subject of the invention, applied to the differential of a small agricultural tractor, with a clearance or freedom of movement varying from slightly less than one revolution to more than one revolution.

Fig. 1 shows, in elevation, a cross section of a small tractor, passing through the axis of the driving wheels, the differential of the tractor being provided with the first form of construction of the locking mechanism.

Fig. 2 shows, seen in perspective and to a larger scale, the outside of the central part of the left hand wheel in Fig. 1.

Fig. 3 shows in elevation and in section the left hand wheel of the same tractor, with a second form of construction of the locking mechanism.

Fig. 4 shows, seen in perspective and to a larger scale, the outside of the central part of this wheel.

Fig. 5 shows, in elevation and in section, another form of construction of the mechanism.

Finally, Fig. 6 shows, in perspective and to a larger scale, the outside of the latter form of construction.

In Fig. 1, 1 indicates in section the speed gear box of the tractor, through which passes the shaft 2 of the driving wheels, which shaft rotates in ball bearings 3 and 4 of the gear box. The shaft 2 is surrounded by a hollow shaft 5 which is driven by the motor of the tractor, by means of one or the other of gear wheels, 7, 7' and 7". The hollow shaft 5 passes out of the left hand end of the speed gear box and its end 6 drives the cross bar 8 supporting the satellite pinions 9 of the differential. The satellites in turn drive the sun wheels 10 and 11. The outer sun wheel 10 is keyed to the wheel shaft 2 and consequently drives the right hand driving wheel 12, of which the hub 13 is keyed to the right hand end of the shaft 2. The inner sun wheel 11 is keyed in the half casing 14 of the differential. The other half of this casing is formed by the central portion of the left hand driving wheel 15. The wheel 15 is thus driven by the inner sun wheel 11 by means of the half casing 14.

For locking the differential, it is necessary to secure together the two sun wheels 10 and 11 and consequently the two driving wheels 12 and 15. For this purpose, it suffices to lock the shaft 2, which is locked to the sun wheel 10 and to the driving wheel 12, to the wheel 15, which is locked to the sun wheel 11. The mechanism shown in section in Fig. 1 and in perspective in Fig. 2, and which forms the subject of the invention, enables these two parts of the tractor to be locked with a clearance allowing one of the parts to describe a little less than a complete revolution relatively to the other. This mechanism consists of a plate 16, keyed to the left hand end of the shaft 2. This plate carries a rocking lever 17 which can assume the locking position shown in Figs. 1 and 2, or which can be rocked rearwardly by pressing with a hand on the tail 18 of the lever. On the other hand, the wheel 15 is provided with a boss or tooth 19, against each of the faces of which abuts the lever 17, rocked into its locking position, after the wheel 15 has turned sufficiently relatively to the shaft 2. It will be seen that the clearance of the lever between its two locking positions, on each side of the boss 19, is in fact a complete revolution minus the thickness of the boss and the thickness of the lever.

When thus the left hand wheel 15 of the tractor rolls on the untilled soil and commences to skid, that is to say to turn in advance relatively to the shaft 2 and to the right hand wheel 12, its stop 19 comes into contact with the lever 17 after having skidded for slightly less than a complete revolution, that is to say very rapidly. From this instant, the wheel 15 can no longer skid, as it abuts by its boss 19 against the lever 17 which is secured to the shaft 2. The wheel 15 should thus turn at the same angular speed as the shaft 2 and the wheel 12. When the tractor has reached the end of the furrow and the driver desires to turn it through 180°, it suffices, if he desires to turn for the return journey to actuate the separate brake 20 for the right hand wheel 12, which has not skidded because it has rolled in the bottom of the furrow. The tractor turns for the return journey about the pivot formed by the wheel 12 locked by its brake. When the spacing between the wheels 12 and 15 is less than the outer diameter of the type of the wheels, at least one complete revolution to the rear of the wheel 15 is required so as to turn the tractor through 180°. But the boss 19 of the wheel 15 can carry out exactly slightly less than a complete revolution rearwardly before again coming into contact with the other face of the lever 17. When the driver desires to turn for forward travel, he locks, on the contrary the left hand wheel 15 by its brake 21, and the right hand wheel 12, the shaft 2 and the lever 17 carry out a complete revolution forwardly until the face of the lever 17 comes into contact with the boss 19. Finally the driver may, if he desires, carry out a part of turning by rearward travel and the other part by forward travel, by successively locking the wheel 12, then the wheel 15, of vice versa. It will be understood that the mechanism above described may be reversed, in the sense that the lever 17 may be associated with the wheel 15 and the stop 19 with the plate 16. The operation of the reversed mechanism is exactly the same. But when the outer diameter of the driving wheels is smaller than the spacing between these wheels, it is necessary for the outer wheel during steering to carry out more than a complete revolution in order to turn the tractor through 180°.

The forms of construction of the subject of the invention shown in Figs. 3 to 6 enable the tractor, also in this case, to carry out a complete turning movement of 180° without the necessity of releasing the differential. The locking mechanisms of these modified forms of construction consist in interposing a free ring, having a nose, between the lever driven by the shaft and at least one boss secured to the wheel, or even between the lever driven by the wheel and at least one boss driven by the shaft. In this manner the clearance equals a little less than a complete revolution of the lever (driven by the shaft) relatively to the nose of the ring which is added to the clearance existing between the nose of the ring and the boss or bosses of the wheel, so that the total clearance obtained is more than one complete revolution.

In Fig. 3, which shows in vertical section the same left hand wheel of the tractor as in Fig. 1, there is again shown the shaft 2 to which are keyed the outer sun wheel 10 and a plate 16 carrying the lever 17 with its tail 18 serving as operating member. The wheel 15 again carries a boss 19, but this boss need not be narrow like a tooth. As shown in Fig. 4 in perspective, this boss may occupy a portion of the circumference of the wheel so that its two bearing faces 19' and 19" are only separated by a predetermined angle, for example an angle of 90° as shown in this figure. The lever 17, shown in Fig. 3 in the locking position, does not meet the faces 19' and 19" of the boss 19. But on a central portion 22 of the wheel 15, a ring 23 is freely mounted having a nose 24 and this nose is sufficiently wide so as to be capable of meeting, both the lever 17 and one of the faces 19' and 19" of the boss 19. It will be seen clearly in Fig. 4 that the total clearance between the shaft 2 and the wheel 15 is composed of the clearance of the lever 17 relatively to the nose 24, plus the clearance of the nose relatively to the two faces 19' and 19" of the boss 19. It is easily possible in this manner to obtain a clearance exceeding a complete revolution which is necessary for a tractor provided with wheels of a diameter less than their spacing for turning through 180°. As it is useless for the tractor to turn through more than 180°, it is not desirable to increase too much the angle, separating the two faces 19' and 19" of the boss 19. As by increasing this angle, that is to say by reducing the circumferential length of the boss 19, the time during which the wheel rolling on the untilled ground skids until the final abutment of the lever and of the boss takes place would be increased uselessly.

Figs. 5 and 6 show the same device, but reversed. In these figures the lever 17 is secured to the wheel 15. The ring 23 with its nose 24 turns freely on a sleeve 25 keyed to the shaft 2, and in this case replaces the plate 16 in Figs. 1 to 4. The sleeve 25 has a boss 26, which is shown as being very short and similar to a tooth in Fig. 6, but which circumferentially may be much longer, like the boss 19 in Fig. 4. The nose 24 of the ring 23 is met by the lever 17, when the bolt is rocked into its locking position shown in Fig. 6. But in this locking position, the lever 17 passes to the outside of the boss 26 and does not meet it. It is the internal part 24' of the nose 24 which abuts against the boss 26. In the mechanism shown in Fig. 6, a total possible clearance slightly less than two complete revolutions is provided between the shaft 2 and the wheel 15, when there is only a single relatively short boss 26, as shown, but a second boss identical with the boss 26 may be provided at 90°, for example from the latter, and consequently not seen in the figure. In this case the clearance between the shaft 2 and the wheel 15 is of the same order of magnitude as that of the mechanism shown in Figs. 3 and 4.

The locking mechanism of a differential may be applied, if necessary to any type of differential and not only to the differential of a small agricultural tractor.

I claim:

1. In a motor vehicle, the combination, comprising, a differential having two sun wheels and at least two planet wheels, a boss rigid with one of the sun wheels, a lever rotatable with the other sun wheel, means rotatable about the axis of the sun wheels and extending into the paths of the boss and the lever and after a predetermined rotation causing the rotating bolt to rotate the boss and sun wheel thereof.

2. The combination according to claim 1, wherein the lever is pivoted to the other sun wheel for motion radially thereof.

3. The combination according to claim 1, wherein the boss moves in a path having a radius smaller than the radius of the path of the bolt.

LÉON DUFOUR.

REFERENCES CITED

The following references are of record in the file of this patent:

UNITED STATES PATENTS

| Number | Name | Date |
| --- | --- | --- |
| 275,279 | Snyder et al. | Apr. 3, 1883 |
| 306,403 | Kelley et al. | Oct. 14, 1884 |
| 699,808 | Norris | May 13, 1902 |
| 928,293 | Waterman | July 20, 1909 |
| 1,134,665 | Blakey | Apr. 6, 1915 |
| 1,704,803 | Mlinko | Mar. 12, 1929 |
| 2,420,294 | Beckwith | May 13, 1947 |

FOREIGN PATENTS

| Number | Country | Date |
| --- | --- | --- |
| 6,424 | Great Britain | Dec. 14, 1905 |